United States Patent [19]

Brothers

[11] Patent Number: 4,498,747
[45] Date of Patent: Feb. 12, 1985

[54] MOTION PICTURE CAMERA

[76] Inventor: Bennie R. Brothers, 1731 N. Normandie, Hollywood, Calif. 90027

[21] Appl. No.: 519,484

[22] Filed: Aug. 1, 1983

[51] Int. Cl.³ .......................... G03B 41/04; G03B 9/10
[52] U.S. Cl. ..................................... 352/191; 352/208
[58] Field of Search ................................ 352/191–197, 352/208

[56] References Cited

U.S. PATENT DOCUMENTS

| | | | |
|---|---|---|---|
| 1,865,186 | 6/1932 | Harris | 352/208 UX |
| 2,052,960 | 9/1936 | Berggren | 352/208 |
| 3,168,743 | 2/1965 | Nesson | 352/191 X |
| 3,736,052 | 5/1973 | Lecoeur | 352/191 X |

Primary Examiner—Donald A. Griffin
Attorney, Agent, or Firm—Ralph B. Pastoriza

[57] ABSTRACT

A motion picture camera includes a film pull down mechanism and shutter in which film is moved from one frame to the next in a 360° operating cycle made up of a pull down time and a dwell time. The film pull down mechanism is designed to pull the film down in a period less than the dwell time of the film so that film exposure is increased over that occurring when the pull down time and dwell times are equal. The shutter has an opaque sector less than 180° and an open sector greater than 180° responsive to operation of the pull down mechanism to eclipse the film from exposure during the pull down time. The film pull down mechanism further includes a means for varying the length of film pulled down so that film frames of different vertical dimensions can be properly exposed by the same motion picture camera.

11 Claims, 10 Drawing Figures

MOTION PICTURE CAMERA

FIELD OF THE INVENTION

This invention relates generally to motion picture cameras and more particularly to an improved film pull down mechanism and shutter for a motion picture camera cooperating together to effectively increase the exposure time of each film frame.

BACKGROUND OF THE INVENTION

In conventional motion picture cameras, a film is moved from one frame to the next by a film pull down mechanism usually in the form of film pull down claws which engage the film perforations. A cooperating shutter mounted for rotation includes an opaque section over at least 180° for eclipsing the film in the aperture during the pull down time.

In many pull down mechanisms, the rate of movement of the pull down claws from their initial point of engagement of the perforations to the point where they release the perforations corresponds approximately to the same time for the claws to return to again engage the perforations and release the perforations. In other words, the pull down time is about equal to the dwell time of the film in the aperture. Under these circumstances, the maximum exposure for each film frame can only take place during 180° of the entire 360° operating cycle made up of the pull down time plus the dwell time.

In reality, the exposure time is less than 180° since it is desirable to only expose the film frame when the aperture is completely open by the shutter. Since the aperture has physical height and length dimensions, the same is only completely eclipsed after the leading edge of the shutter has left the far corner of the aperture and before the trailing edge leaves the near corner of the aperture. These corners subtend an angle which is thus subtracted from the 180° during which it would be desirable to expose the aperture. If such angle subtended by the corners of the aperture is 80°, then there is in reality only an exposure of the film frame during 100° of the total 360° cycle.

By a special design of pull down claws involving levering action in cooperation with a rotating pivot, the pull down time can be made less than the dwell time thereby enabling an increase in the exposure time. Some camera manufacturers provide an arrangement wherein exposure takes place during times when the aperture is not completely open that is, corner portions of the aperture are exposed and the quality of the resulting image is sacrificed simply in order to increase the exposure time for each frame.

With the advent of different aspect ratios for film frames, it would be desirable to provide in a motion picture camera some means of changing or varying the actual length of film moved during each pull down time. By such an arrangement, the camera would be adaptable to film frames of different dimensions. Under normal conditions, for a particular frame size, there must be designed a specific camera with a specific pull down mechanism.

BRIEF DESCRIPTION OF THE PRESENT INVENTION

With the foregoing considerations in mind, the present invention contemplates the provision of a greatly improved motion picture camera including a specially constructed pull down mechanism and cooperating shutter which enable the exposure time to be increased during a complete opening of the aperture by the shutter so that the quality of the photographed image is not impaired. Further, the mechanism includes a simple adjusting means so that the length of film pulled down by the pull down mechanism can easily be varied so that the same motion picture camera can be accommodated to operate with different frame dimensions.

Thus, in its broadest aspect, the invention includes means for effecting pull down of the film in a period less than the dwell time of the film so that film exposure is increased over that occurring when the pull down time and dwell times are equal. Cooperating with this means is a shutter having an opaque sector less than 180° and an open sector greater than 180° responsive to operation of the pull down mechanism to eclipse the film from exposure during the pull down time.

BRIEF DESCRIPTION OF THE DRAWINGS

A better understanding of this invention will be had by referring to the accompanying drawings in which.

DETAILED DESCRIPTION OF THE INVENTION

Figure 1:
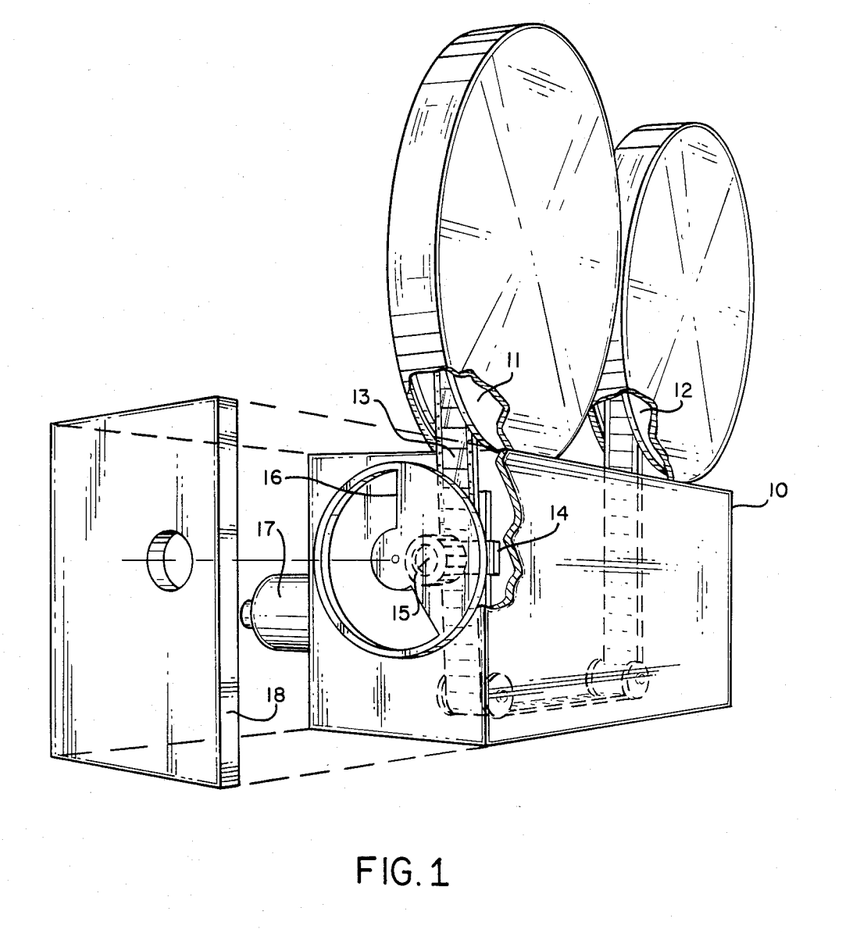
FIG. 1 is a schematic exploded perspective view of a motion picture camera in accord with this invention.

Referring first to FIG. 1, there is shown a camera casing 10 with pay-out and take-up reels 11 and 12 mounted to the casing for paying out and taking up motion picture film negative 13 to be exposed.

A film gate and aperture assembly is indicated generally at 14 in FIG. 1 mounted to the casing 10 for receiving the film 13 passing from the pay-out reel to the take-up reel. A lens 15 is shown mounted in the casing in front of the film gate and aperture assembly 14.

Also shown in FIG. 1 is a shutter 16 rotatably mounted to the casing 10 between the lens 15 and film gate and aperture 14. Film pull down mechanism for moving the film 13 one frame at a time through the film gate and aperture assembly is provided in the casing 10 and will be described subsequently. This film pull down mechanism is driven by an appropriate motor shown at 17 which motor also drives the shutter 16 in synchronism with the pull down mechanism.

In FIG. 1, a front plate 18 has been exploded forwardly to expose the shutter and lens. It will be understood that this plate when secured to the front of the camera shields the shutter and other portions of the film gate and aperture assembly from ambient light.

Figure 2:
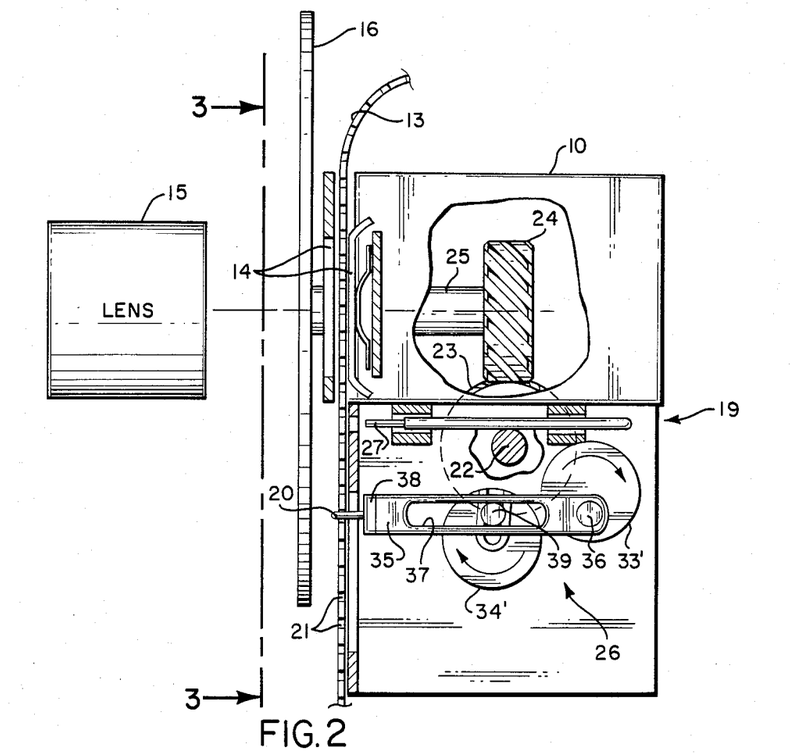
FIG. 2 is a cross section taken in the direction of the arrows 2—2 of FIG. 1 also partly schematic in form.

Referring now to FIG. 2, further details of the motion picture camera will be described. In FIG. 2, the lens 15 is shown in schematic form properly aligned with the film gate and aperture assembly 14.

The film pull down mechanism referred to with respect to FIG. 1 is indicated generally by the arrow 19 in FIG. 2 and includes pull down claws 20 for engaging sprocket holes 21 to move the film 13. This motion is derived from an input shaft 22 shown in the broken away portion of FIG. 2 which extends from the motor 17 described in FIG. 1. Shaft 22 carries an helical gear 23 meshing with another helical gear 24 connected to shutter shaft 25 for rotating the shutter 16 as also shown in the broken away portion of the showing in FIG. 2.

A motion conversion means designated generally by the arrow 26 couples the input shaft 22 to the pull down claws 20 such that in each 360° cycle of operation made up of the pull down time and dwell time, the pull down time is less than 90° of the cycle and the dwell time is greater than 270° of the cycle. As a consequence, a greater exposure time of each film frame in the film gate and aperture 14 results than when the pull down time and dwell times are equal. The manner in which this motion conversion means operates will be described in detail subsequently.

Still referring to FIG. 2, there is indicated at 27 film indexing pins which are arranged to be moved in response to rotation of the input shaft 22 to cause the pins to engage sprockets 21 in the film during at least the initial part of the dwell time to assure that successive film frames occupy consistent positions in the film gate and aperture assembly during the dwell time. The manner in which the indexing pins are moved will also be described in detail subsequently.

Figure 3:
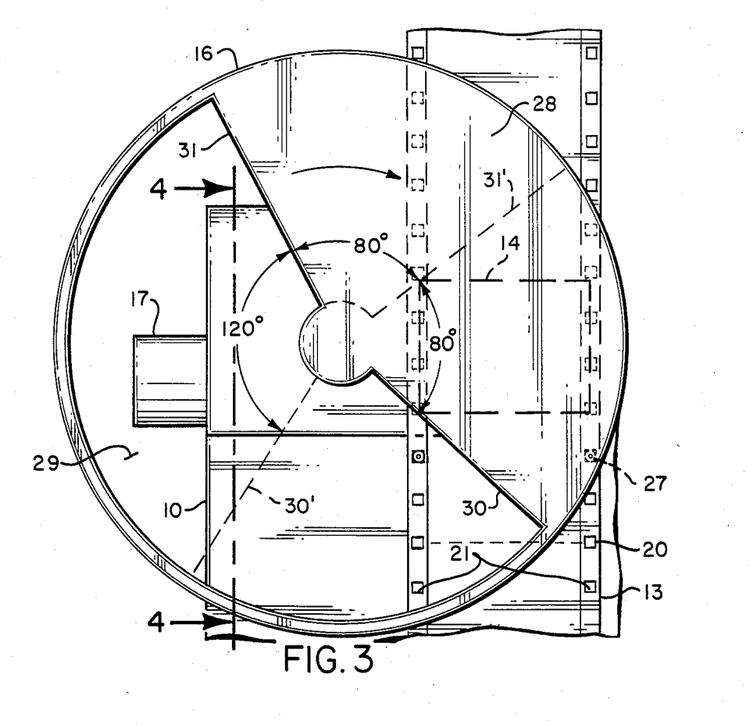
FIG. 3 is another cross section taken in the direction of the arrows 3—3 of FIG. 2.

Referring now to FIG. 3, it will be noted that the shutter 16 includes an opaque section 28 extending over an arcuate distance less than 180° and a clear or open section 29 extending over an arcuate distance greater than 180°. Also illustrated in FIG. 3 in phantom lines is the aperture 14 behind the opaque section 28 of the shutter dimensioned for a single film frame.

In the particular position of the shutter 16, the leading edge of the opaque section 28 is shown at 30 in a position just leaving the lower left corner of the aperture 14 so that the aperture 14 is completely eclipsed by the opaque portion 28 until such time as the trailing edge 31 of this portion reaches the upper left corner of the aperture 14 as at 31'. When in this position, the leading edge 30 of the shutter will be in the position 30' shown in FIG. 3.

From the foregoing, it will be evident that the aperture 14 is only completely eclipsed by the shutter over an arc of 80°.

It can also be appreciated from FIG. 3 that the aperture 14 will only be completely exposed or free of the opaque section 28 of the shutter over a section of 120°. In other words, when the trailing edge 31 leaves the lower left corner of the aperture 14 to completely expose the aperture 14, the shutter will move through 120° before the leading edge 30 starts to eclipse the aperture 14 at its upper corner. If exposure time is counted from the moment of the first exposure of any portion of the aperture such as at its corners to the complete eclipsing of the aperture, it will be evident from FIG. 3 that this complete exposure time is about 200°. In any event, from the showing of FIG. 3, it will be apparent that the shutter has an opaque section extending over an arcuate distance sufficient to assure that the aperture is completely eclipsed during the pull down time. Further, it will be evident that this arcuate distance is less than 180°.

Figure 4:
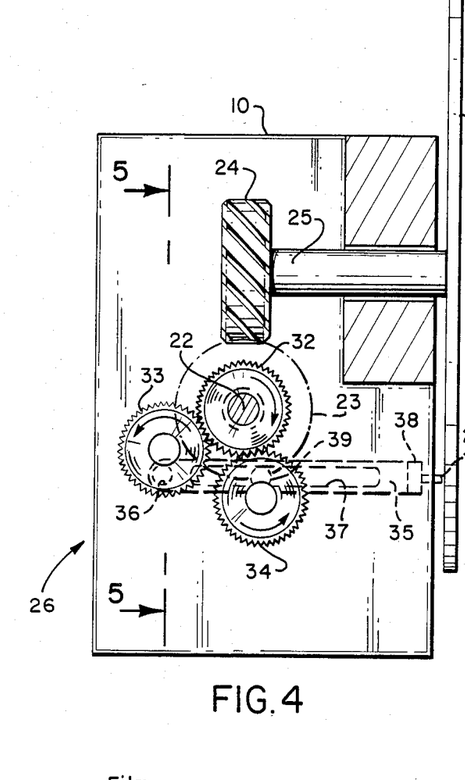
FIG. 4 is a cross section taken in the direction of the arrows 4—4 of FIG. 3.
Figure 5:
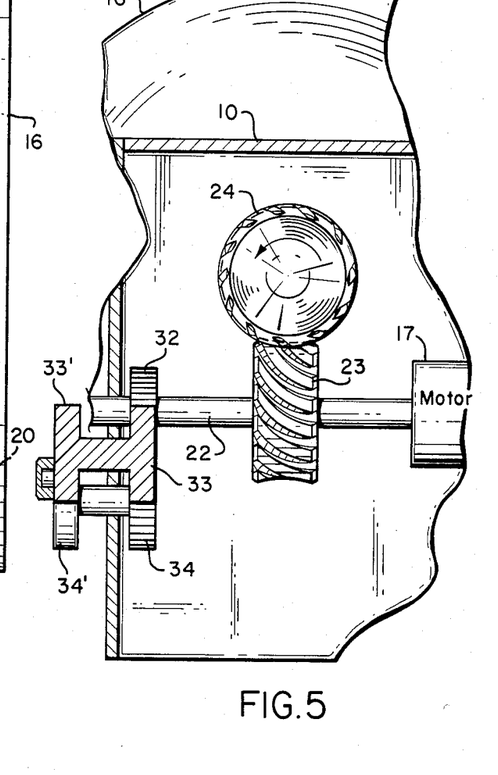
FIG. 5 is a cross section taken in the direction of the arrows 5—5 of FIG. 4.

Referring now to FIGS. 4 and 5, further details of the pull down mechanism including the motion conversion means responsive to rotation of the shaft 22 will become evident. FIG. 4 shows the back side as opposed to FIG. 2. The helical gear 23 driven by the shaft 22 and meshing with the helical gear 24 for rotation of the shutter described in FIG. 2 is shown in phantom in FIG. 4 to avoid obscuring other portions of the drawing.

As shown in FIG. 4, the input shaft 22 includes a drive gear 32. A pivot support gear 33 and a cam support gear 34 lying in a common plane are in meshing engagement with circumferentially spaced gear teeth on the drive gear 32 as shown. As a consequence, rotation of the drive gear 32 by the input shaft 22 rotates the pivot support gear 33 and cam support gear 34 simultaneously in the same direction, all as indicated by the arrows.

Referring back to FIG. 2, the pivot support gear and cam support gear 33 and 34 have front faces 33' and 34'. A lever 35 also shown in phantom lines in FIG. 4 has a pivot 36 at one end carried by the front pivot support gear 33' as shown. Also, the lever 35 includes a cam slot 37 at its central portion together with pull down claw holding means 38 at its opposite end for holding the pull down claws 20. A cam roller 39 shown on the cam support gear front portion 34' is received in the cam slot 37. The pivot 36 is carried on the pivot support gear front portion 33' at a first given radial distance from its center. The cam roller 39, in turn, is secured on the cam support gear front portion 34' at a second given radial distance from its center. The pivot support gear front portion and cam support gear front portion are positioned relative to each other such that when the pivot 36 is in its lowest position as shown, the cam 39 is in its highest position. This highest position is forward of and at approximately the same horizontal level as the lowest position of the pivot as illustrated in FIG. 2.

As a consequence of the foregoing described geometry, when the pivot support gear and cam support gears are rotated, the lever 35 will execute a motion such that the downward motion of the pull down claws is effected in less than 90° of rotation and the subsequent upward motion of the pull down claws to their initial position is effected during the subsequent greater than 270° rotation of these gears.

Figure 6:
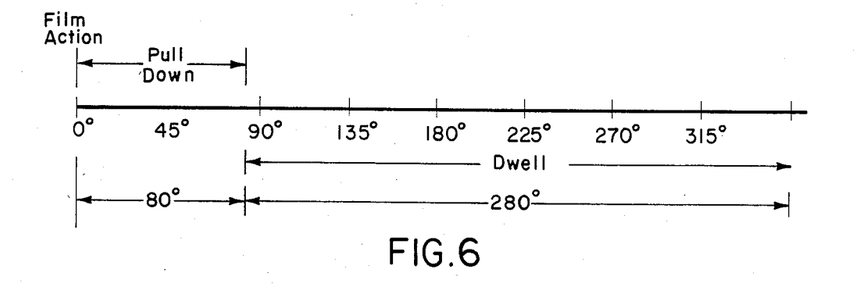
FIG. 6 is a graphic representation of the film action during a 360° cycle of operation.

FIG. 6 illustrates the resulting film action as a consequence of the above-described action of the pull down claws. Thus, the pull down period is shown as approximately 80° while the dwell period of the film in the film gate and aperture 14 is approximately 280° of the total 360° cycle making up one complete rotation.

Figure 7:
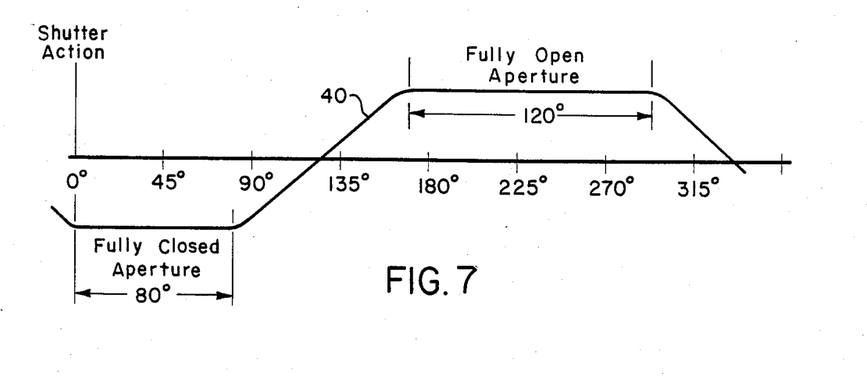
FIG. 7 is a graphic representation of the shutter action during the same 360° cycle of operation.

FIG. 7 illustrates graphically by the line 40 the shutter action already described in conjunction with FIG. 3 wherein again it will be noted that the shutter will fully eclipse the aperture to close the same during 80° and will fully open the aperture during 120° within the overall 360° cycle of rotation of the shutter.

Figure 8:
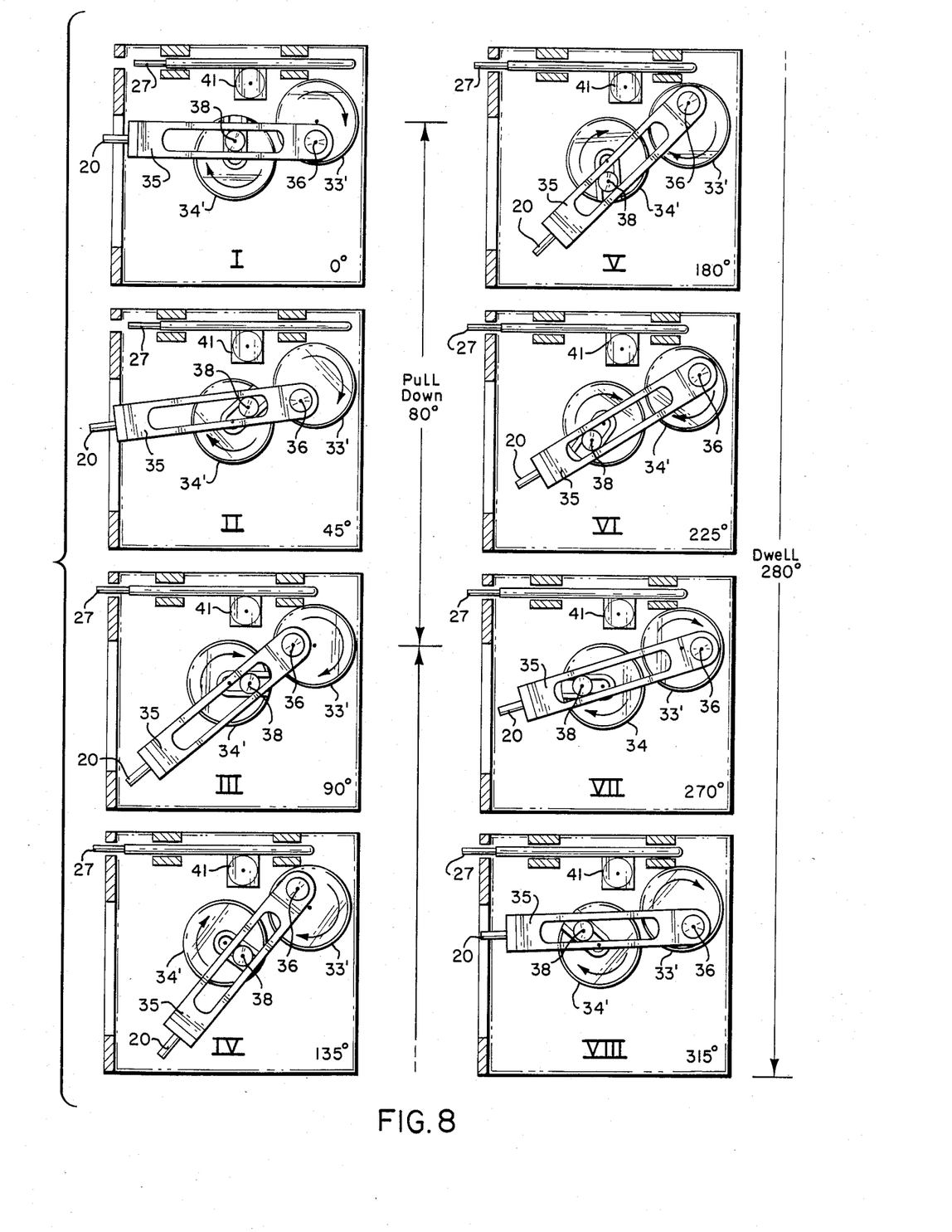
FIG. 8 discloses a series of diagrams illustrating the relative positions of components of the pull down mechanism of this invention at 45° steps over a 360° cycle.

In order to better appreciate the described pull down motion of the pull down mechanism, reference is now had to the schematic showing of FIG. 8 which illustrates the action of the lever 35 as a result of rotation of the pivot support gear and cam support gear front face portions shown at 33' and 34'.

Referring first to the upper left view designated I the position of the pivot 36 and the cam roller 38 are the same as depicted in FIG. 2, the pull down claws 20 at this instance making an initial engagement with film.

In the next view, II, a 45° rotation has been effected to position the pivot pin 36 and the cam roller 38 closer together as shown. This action has resulted in a downward movement of the pull down claws 20.

In the next 45° rotation to the position illustrated in III, it will be noted that the pull down has been completed and the pull down claws 20 have just left the film perforations. Actually, the disengagement of the pull down claws 20 with the film ocurs at approximately 80° so that the entire pull down operation takes place in the first 80° of the cycle as indicated in FIG. 8.

It will be noted in the showings of I, II and III that the pivot pin 36 and cam roller 38 have been brought to their closest position to each other. It will be evident by now examining the remaining 45° step positions IV through VIII, there is required approximately 280° to bring the pull down claws 20 back to their initial position illustrated in I.

The foregoing is a consequence of the fact that in the subsequent 45° steps, the pivot pin 36 and the cam roller 38 are being separated to their furthest-apart position which action necessarily results in a relatively slower movement of the pull down claws 20 when returning upwardly to the initial position shown in I. In other words, during this return period of the pull down claws, the film is disengaged and is dwelling in the aperture over the 280° portion of the cycle indicated.

In the various diagrams I through VIII it will be noted that the indexing pins 27 are retracted during the pull down action of the claws 20; that is, in the views I and II. At the end of 80°, an appropriate index pin moving means depicted by the box 41 in diagram I operates to move the indexing pins 27 into engagement with sprockets in the film to hold the film during its dwell period or at least during the initial part of its dwell period.

In one embodiment, the index pin moving means 41 will cause the indexing pins 27 to engage the film substantially throughout the entire dwell period of 280° as depicted in FIG. 8. However, it is not necessary that the film indexing pins engage the film throughout the entire dwell period but rather only during the initial part of the dwell period to assure that subsequent frames will be consistently positioned.

Figure 9:
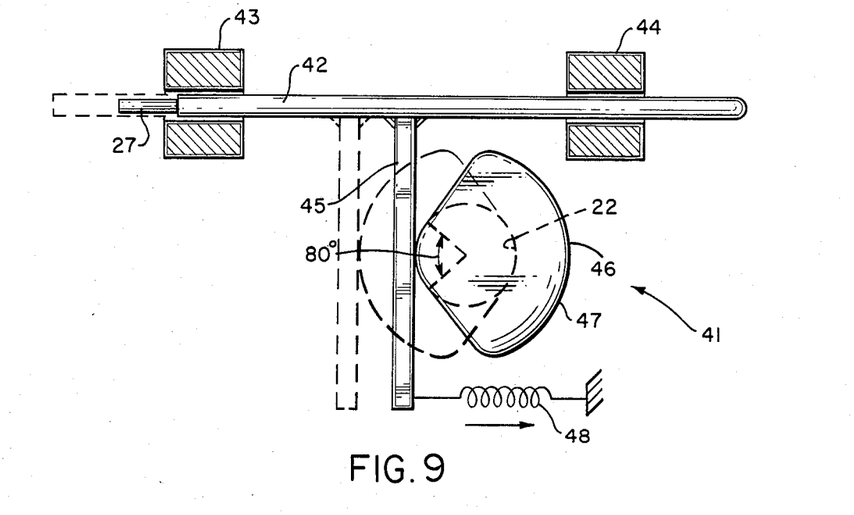
FIG. 9 is a schematic showing of one type of index pin moving means cooperating with the pull down mechanism of this invention.

Referring now to FIG. 9, there is shown the referred-to embodiment of the index pin moving means 41. Essentially, the structure includes a shaft 42 mounting the indexing pins 27 for rectilinear motion towards and away from perforations in the film. Towards this end, there are provided bearing guides 43 and 44 for the shaft 42.

A cam follower schematically indicated at 45 extends laterally from the axis of the shaft 42. The index pin moving means includes a cam wheel 46 having a peripheral cam surface 47 engaging the cam follower 45 and responsive to rotation of the input shaft 22 to move the indexing pins 27 into engagement with the sprocket holes in the film during at least part of the dwell time of the film and out of engagement with the sprocket holes during the pull down time of the film, as described.

By shaping the exterior cam surface 47 of the cam wheel 46 such that the surface portion closest to the radius only extends over approximately an 80° arc before the surface portion starts moving away from the center of the cam wheel, then the cam pins 27 will be retracted to the solid line position only during essentially the pull down time of the film and will engage the sprocket holes during substantially the entire dwell time. In FIG. 9, there is schematically depicted at 48 a spring biasing the cam follower arm 45 against the peripheral cam surface 47 of the cam wheel 46.

Figure 10:
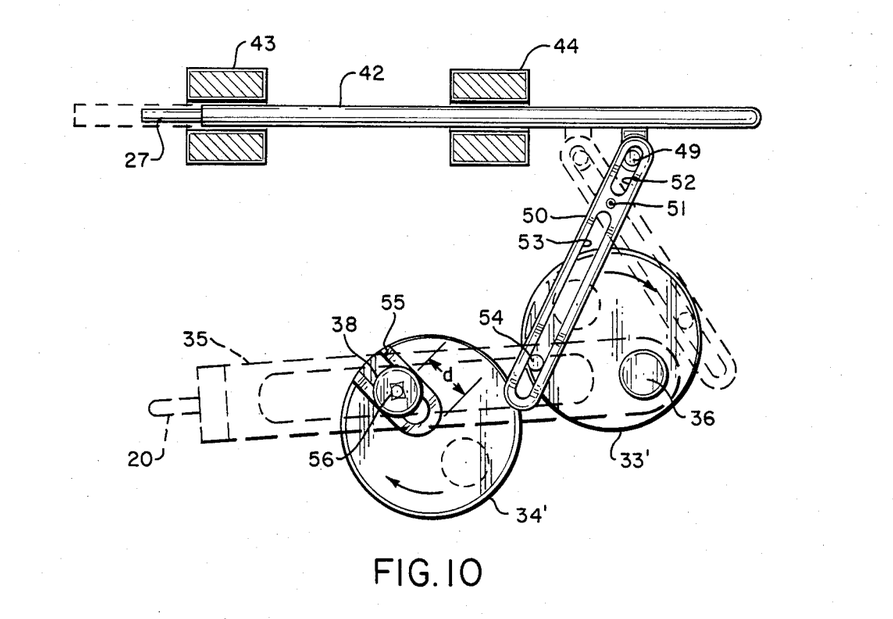
FIG. 10 is a view similar to FIG. 9 of an alternative index pin moving means in accord with the present invention.

FIG. 10 illustrates an alternative index pin moving means. In this embodiment, the index pins 27 are held again on the shaft 42 mounted in appropriate guide blocks 43 and 44 for rectilinear motion.

Rather than a cam follower extending laterally from the shaft 42 as in FIG. 9, there is provided a cam follower pin 49. The index pin moving means, in turn, includes a lever 50 pivoted intermediate its ends at 51 for swinging movement about an axis parallel to and spaced from the axis of rotation of the pivot support gear face 33'. Lengths of the lever on either side of its pivot point 51 have cam slots 52 and 53. The slot 52 receives the cam follower pin 49 as shown. A cam pin 54 is provided on the pivot support gear front face 33' radially spaced from the center of this gear and is received in the other cam slot 53 of the lever. As a consequence, rotation of the pivot support gear front face 33' rocks the lever 50 back and forth to move the indexing pins 27 into engagement with appropriate perforations in the film during at least part of the dwell time and disengage the pins from the perforations during the pull down time of the film. In this instance, the time that the pins engage the film is approximately equal to the time that the pins are withdrawn from the film. The arrangement can be designed, however, so that at the cessation of the pull down period, the indexing pins 27 enter almost immediately the perforations to provide for an initial indexing of the film in the film gate and aperture. Thereafter, withdrawal of the indexing pins 27 will not affect the maintenance of the film in the aperture until the next pull down time starts. There is thus assured with either of the embodiments of FIGS. 9 and 10 a proper indexing of each frame in the aperture so that consistent positioning for the respective frames is assured.

FIG. 10 also illustrates a means for varying the length of film pulled down by the pull down claws shown in phantom lines at 20 on the lever 35 described in FIG. 2 so that film frames of different vertical dimensions can be properly exposed. This means includes a radial track 55 on the front face 34' of the cam support gear serving to support the cam roller 38. The arrangement is such that a nut fastener 56 can be loosened and tightened to lock the cam roller 38 at any desired selected position on the track. In other words, the heretofore referred to second given radial distance of the cam roller 38 from the center of the cam support gear front face 34' can be changed to thereby vary the distance through which a film is moved by the pull down claws 20. That this distance depends upon the distance of the cam roller 38 from the center of the cam support gear will be evident by an inspection of the various diagrams in FIG. 8 wherein it will be seen that the further radially outwardly the cam roller 38 is affixed to the cam support gear front face 34', the greater will be the pull down motion of the claws so that a greater vertical dimension of the film frame can be accommodated.

The foregoing constitutes an important feature of the present invention. Minimum pull down would result if the cam roller 38 were positioned at the center of the cam support gear front face 34′ in which event there would in effect be no movement of this cam roller relative to the casing of the camera so that the swinging arc of the lever 35 and pull down claws 20 is solely controlled by the circular movement of the pivot pin 36 on the pivot support gear front face 33′. Essentially, when the cam follower 38 is successively moved greater increments in a radial direction from the center of the cam support gear front face 34′, the amplitude of movement of the pull down claws 20 is increased in successive steps. A large variation in the amount of film pulled down can thus be selected and thus the vertical dimensions of the film frames can be controlled as desired.

From the foregoing, it will now be evident that the present invention has provided a greatly improved motion picture camera in which a greater exposure time for each film frame is realizable over than in conventional cameras. A longer exposure time will permit the taking of motion pictures under poor lighting conditions as well as permit the taking of slow motion motion pictures which requires faster movement of the film under lighting conditions that would only be sufficient for the taking of normal motion pictures.

Further, and as noted, the length of film pulled down by the pull down claws can be varied to fit a desired film frame format.

I claim:

1. A film pull down mechanism and shutter for a motion picture camera in which film is moved fron one frame to the next in a 360° operating cycle made up of a pull down time and a dwell time, said mechanism including:
   (a) means for effecting pull down of said film in a period less than the dwell time of said film so that film exposure is increased over that occurring when the pull down time and dwell time are equal;
   (b) a shutter having an opaque sector less than 180° and an open sector greater than 180° responsive to operation of said pull down mechanism to eclipse said film from exposure during said pull down time; and
   (c) means for varying the length of film pulled down whereby film frames of different vertical dimensions can be properly exposed.

2. In a motion picture camera having a film gate and aperture, a film pull down mechanism and shutter including, in combination:
   (a) means for moving said film through said film gate and aperture from one frame to the next in such a manner that in each 360° cycle of operation made up of the pull down time and dwell time of the film in the aperture, the pull down time is accomplished in less time than the dwell time;
   (b) means for rotating said shutter in response to operation of said pull down mechanism, said shutter having an opaque sector less than 180° positioned to extend over an arcuate distance sufficient to assure that said aperture is completely eclipsed during said pull down time; and
   (c) means in said pull down mechanism for varying the distance through which a film is moved during said pull down time whereby the camera can be used to expose film frames of different vertical dimensions.

3. The subject matter of claim 2, in which said means for moving said film from one frame to the next includes a pivot carrier for moving a pivot in a circle; a cam carrier for moving a cam in a circle lying in the same plane as the circle for said pivot; a lever having one end coupled to said pivot and an intermediate cam slot receiving said cam; film pull down claws secured to the opposite end of said lever, said pivot and cam being positioned on their respective circles 180° out of phase; and drive means for simultaneously rotating said pivot carrier and cam carrier in the same direction to move said pull down claws at a downward rate greater than their upward return rate for each 360° of rotation.

4. The subject matter of claim 3 in which said means for varying the distance through which a film is moved includes a radial track on said cam carrier; and securing means on said track for securing the position of said cam at any selected radial distance from the center of the circle followed by said cam, whereby the movement of said film pull down claws is varied depending upon the selected radial distance.

5. A motion picture camera including, in combination:
   (a) a casing;
   (b) pay-out and take-up reels mounted to said casing for paying out and taking up motion picture film negative to be exposed;
   (c) a film gate and aperture assembly mounted in said casing for receiving film passing from said pay-out reel to said take-up reel;
   (d) a lens mounted in said casing in front of said aperture;
   (e) a shutter rotatably mounted to said casing between said lens and aperture;
   (f) a film pull down mechanism for intermittently moving said film through said film gate in synchronism with rotation of said shutter when taking motion pictures such that film is moved from one frame to the next when said shutter is closed and held stationary in said film gate and aperture assembly when said shutter is open, said pull down mechanism including:
     (1) pull down claws for engaging the film's sprocket holes to move the film;
     (2) an input shaft;
     (3) means for rotating said input shaft;
     (4) means responsive to rotation of said input shaft to rotate said shutter; and
     (5) motion conversion means coupling said input shaft to said pull down claws such that in each 360° cycle of operation made up of the pull down time and dwell time, the pull down time is less than the dwell time whereby a greater exposure time of each film frame results than when pull down time and dwell times are equal and
   (g) means for varying the length of film pulled down whereby film frames of different vertical dimensions can be properly exposed.

6. A camera according to claim 5 including film indexing pins mounted in said casing; and index pin moving means responsive to rotation of said input shaft to cause said indexing pins to engage sprockets in said film during at least the initial part of said dwell time to assure that successive film frames occupy consistent positions in said film gate and aperture assembly during said dwell time.

7. A camera according to claim 6 including a shaft mounting said indexing pins on said casing for rectilinear motion towards and away from perforations in said film, said shaft having a cam follower extending laterally from its axis, said index pin moving means including a cam wheel having a peripheral cam surface engaging said cam follower and responsive to rotation of said input shaft to move said indexing pins into engagement with the sprocket holes in said film during at least part of the dwell time of said film and out of engagement with said sprocket holes during the pull down time of said film.

8. A camera according to claim 6, including a shaft mounting said indexing pins on said casing for rectilinear motion towards and away from perforations in said film, said shaft having a cam follower pin secured thereto, said index pin moving means including a lever pivoted intermediate its ends for swinging movement about an axis parallel to and spaced from the axis of rotation of said pivot support gear, lengths of said lever on either side of its pivot point having cam slots, one slot receiving said cam follower pin; and a cam pin on said pivot support gear radially spaced from the center of the gear received in the other cam slot of said lever so that rotation of said pivot support gear rocks said lever back and forth to move said indexing pins into engagement with perforations in said film during at least part of said dwell time and disengage the pins from said perforations during the pull down time of said film.

9. A camera according to claim 5 in which said shutter has an opaque section extending over an arcuate distance sufficient to assure that said aperture is completely eclipsed during said pull down time, said distance being less than 180°.

10. A camera according to claim 5 in which said motion conversion means includes a drive gear on said input shaft; a pivot support gear and a cam support gear lying in a common plane and in meshing engagement with circumferentially spaced gear teeth on said drive gear so that rotation of said drive gear rotates said pivot support gear and cam support gear simultaneously in the same direction; a lever having a pivot at one end, a cam slot in its central portion and pull down claw holding means at its opposite end holding said pull down claws, said pivot being carried on said pivot support gear at a first given radial distance from its center; a cam roller in said cam slot secured to said cam support gear at a second given radial distance from its center, said pivot support gear and cam support gear being positioned relative to each other such that when said pivot is at its lowest position, said cam is at its highest position, said highest position being forward of and at approximately the same horizontal level as said lowest position whereby the downward motion of said pull down claws is effected in less time than the subsequent upward motion of the pull down claws to their initial position.

11. A camera according to claim 10, in which said cam support gear includes a radial track supporting said cam roller said means for varying the length of film pulled down including means for locking said cam roller at any desired selected position on said track, so that said second given radial distance can be changed to thereby vary the distance through which a film is moved by said pulled down claws.

* * * * *